US012787119B2

(12) United States Patent
Lin et al.

(10) Patent No.: US 12,787,119 B2
(45) Date of Patent: Nov. 3, 2026

(54) HEATING MODULE AND HEATING CONTROL METHOD

(71) Applicant: Wistron Corporation, New Taipei City (TW)

(72) Inventors: Ting Wei Lin, New Taipei City (TW); Han Yang Chen, New Taipei City (TW); Powei Tsao, New Taipei City (TW)

(73) Assignee: Wistron Corporation, New Taipei City (TW)

(*) Notice: Subject to any disclaimer, the term of this patent is extended or adjusted under 35 U.S.C. 154(b) by 287 days.

(21) Appl. No.: 18/749,567

(22) Filed: Jun. 20, 2024

(65) Prior Publication Data

US 2025/0338356 A1 Oct. 30, 2025

(30) Foreign Application Priority Data

Apr. 29, 2024 (TW) ................................ 113115926

(51) Int. Cl.
*H05B 1/02* (2006.01)
*H02M 1/00* (2007.01)

(52) U.S. Cl.
CPC ............ *H05B 1/02* (2013.01); *H02M 1/0003* (2021.05)

(58) Field of Classification Search
None
See application file for complete search history.

(56) References Cited

U.S. PATENT DOCUMENTS

2019/0326814 A1* 10/2019 Cho ...................... H02M 3/157

* cited by examiner

*Primary Examiner* — Sean Shechtman
(74) *Attorney, Agent, or Firm* — JCIPRNET

(57) ABSTRACT

A heating module and a heating control method are disclosed. The heating module includes a buck-boost feedback controller and a programmable controller. The programmable controller converts a control command into a first binary value and a second binary value. The programmable controller writes the first binary value and the second binary value into the buck-boost feedback controller. The buck-boost feedback controller converts the first binary value and the second binary value into a reference voltage value and an output voltage feedback proportion value. The buck-boost feedback controller calculates an output voltage according to the reference voltage value and the output voltage feedback proportion value. The programmable controller outputs the output voltage to a heating carrier.

20 Claims, 5 Drawing Sheets

HEATING MODULE AND HEATING CONTROL METHOD

CROSS-REFERENCE TO RELATED APPLICATION

This application claims the priority benefit of Taiwan application serial no. 113115926, filed on Apr. 29, 2024. The entirety of the above-mentioned patent application is hereby incorporated by reference herein and made a part of this specification.

BACKGROUND

Technical Field

This disclosure relates to a temperature adjustment equipment, and in particular to a heating module and a heating control method.

Description of Related Art

Conventional heating modules, such as those used for heat flow testing of computer equipment, can only be operated by a control device, such as a dip switch, to operate multiple heat carriers providing different wattages or applying to different heating zones, which is costly and limited in application.

SUMMARY

The disclosure provides a heating module and a heating control method, capable of providing effective heating functions.

The heating module according to an embodiment of the disclosure includes a buck-boost feedback controller and a programmable controller. The programmable controller is coupled to the buck-boost feedback controller and configured to receive a control command. The programmable controller converts the control command into a first binary value and a second binary value, and writes the first binary value and the second binary value into the buck-boost feedback controller. The buck-boost feedback controller converts the first binary value and the second binary value into a reference voltage value and an output voltage feedback proportion value, and calculates the output voltage according to the reference voltage value and the output voltage feedback proportion value. The programmable controller outputs the output voltage.

A heating control method according to an embodiment of the disclosure includes the following. A control command is received through a programmable controller. The control command is converted into a first binary value and a second binary value through the programmable controller. The first binary value and the second binary value are written into a buck-boost feedback controller through the programmable controller. The first binary value and the second binary value are converted into a reference voltage value and an output voltage feedback proportion value through the buck-boost feedback controller. An output voltage is calculated according to the reference voltage value and the output voltage feedback proportion value through the buck-boost feedback controller. The output voltage is outputted through the programmable controller.

Based on the above, the heating module and the heating control method of the disclosure can control the buck-boost feedback controller through the programmable controller according to the control command to output the corresponding output voltage to the heating carrier, so that the heating carrier provides the corresponding heating function.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
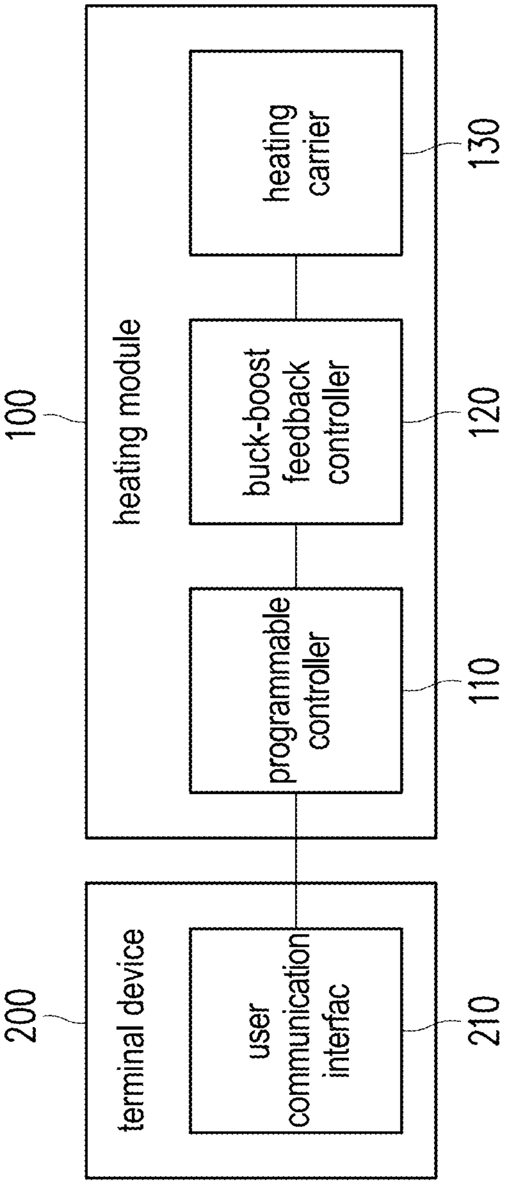
FIG. 1 is a schematic diagram of a heating module and a terminal device according to an embodiment of the disclosure.

Some embodiments of the disclosure are described in detail below with reference to the accompanying drawings. The reference numerals cited in the following description are regarded as the same or similar elements when the same reference numeral appears in different drawings. These embodiments are only part of the disclosure and do not disclose all possible implementations of the disclosure. Rather, these embodiments are merely examples of devices and methods within the scope of the claims.

FIG. 1 is a schematic diagram of a heating module and a terminal device according to an embodiment of the disclosure. Referring to FIG. 1, a heating module 100 includes a programmable logic controller (PLC) 110, a buck-boost feedback controller 120, and a heating carrier 130. The buck-boost feedback controller 120 is coupled to the programmable controller 110 and the heating carrier 130. A terminal device 200 includes a user communication interface 210. The programmable controller 110 is also coupled to the user communication interface 210 of the terminal device 200 to receive a control command from the user communication interface 210 of the terminal device 200. In this embodiment, the terminal device 200 may be, for example, a laptop or a desktop computer, and the disclosure is not limited thereto. In this embodiment, the user communication interface 210 may include a universal serial bus (USB) interface, and may be connected to the programmable controller 110 through a USB cable. A user may send a control command to the programmable controller 110 through the user communication interface 210 by operating the terminal device 200, so that the programmable controller 110 may output a corresponding output voltage to the heating carrier 130 through the buck-boost feedback controller 120. In addition, in one embodiment, the heating module 100 may be a control module, and the heating carrier 130 may be externally disposed outside the heating module 100.

In one embodiment, the terminal device 200 may also be a mobile device such as a tablet or a smartphone, and the user communication interface 210 may also include a relevant wireless communication interface such as WIFI, Bluetooth, or a local area network (LAN) to connect to the programmable controller 110 through wireless communication.

In this embodiment, the heating module 100 may be applied to heat flow testing, for example. The user may place the heating module 100 or the heating carrier 130 in a target heating region. The user may connect the heating module 100 to the terminal device 200 and set a desired heating temperature or wattage by operating the terminal device 200. The terminal device 200 may send a corresponding control command to the programmable controller 110 to output an output voltage corresponding to the desired heating temperature or wattage to the heating carrier 130 through the buck-boost feedback controller 120. In this way, the heating carrier 130 may be effectively driven to provide heating temperature. The heating module 100 may provide convenient heating control functions.

Figure 2:
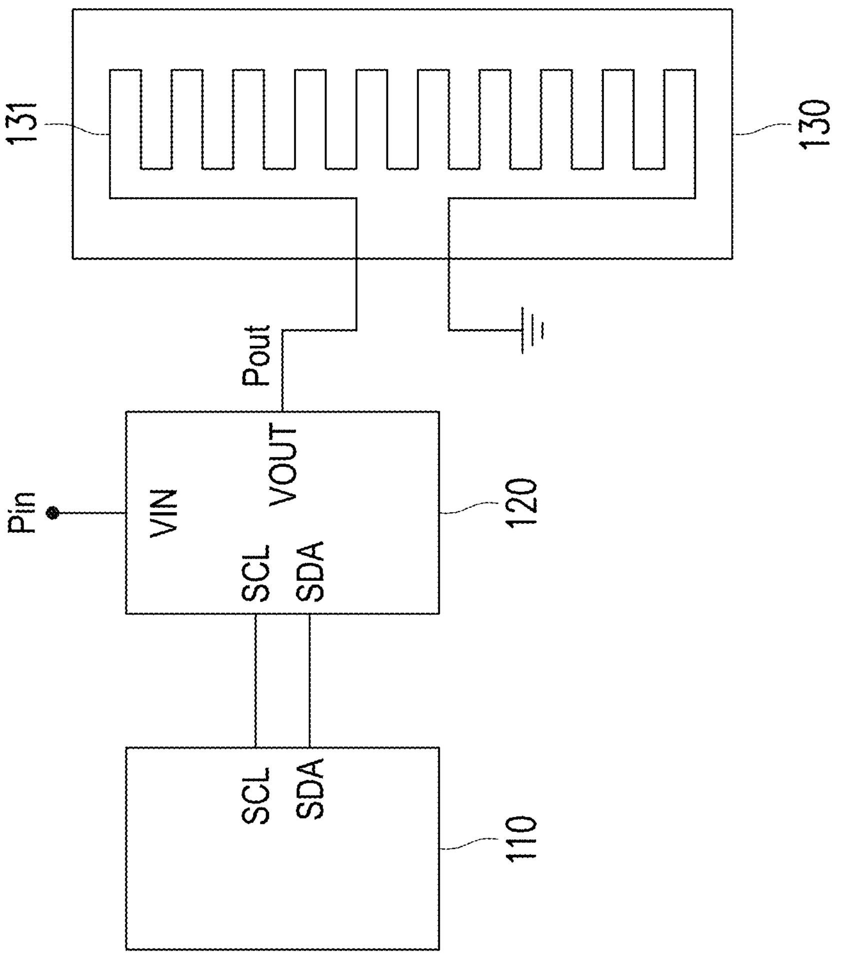
FIG. 2 is a schematic circuit diagram of a heating module according to an embodiment of the disclosure.

FIG. 2 is a schematic circuit diagram of a heating module according to an embodiment of the disclosure. Referring to FIG. 1 and FIG. 2, the heating module 100 of FIG. 1 may implement a circuit architecture as shown in FIG. 2, but the disclosure is not limited thereto. In this embodiment, the programmable controller 110 may be coupled to the buck-boost feedback controller 120 through an inter-integrated circuit (I2C) interface, but the disclosure is not limited thereto. The programmable controller 110 may be coupled to a serial data line pin SDA and a serial clock line pin SCL of the buck-boost feedback controller 120 through a serial data line pin SDA and a serial clock line pin SCL. The programmable controller 110 may also be coupled to the user communication interface 210 of the terminal device 200 of FIG. 1 through relevant Bluetooth communication pins.

In this embodiment, the buck-boost feedback controller 120 may receive an input voltage (power) Pin through an input voltage pin VIN, and may be coupled to the heating carrier 130 through an output voltage pin VOUT. The buck-boost feedback controller 120 may provide an output voltage Pout to the heating carrier 130 through the output voltage pin VOUT. In this embodiment, the heating carrier 130 may include a heating coil 131. The heating coil 131 may be coupled between the output voltage Pout and a ground voltage. In this embodiment, the heating carrier 130 may be, for example, a polyimide (PI) film heating sheet, but the disclosure is not limited thereto. In one embodiment, the heating carrier 130 may be a heating sheet such as a polyester film heating sheet or a mica heating sheet, or the like.

In this embodiment, the buck-boost feedback controller 120 may support input voltage Pin with different input voltage specifications, such as 2.7 volts to 36 volts. The buck-boost feedback controller 120 may also support output voltage Pout providing different output voltage specifications, such as 0.8 volts to 20 volts. Moreover, the heating carrier 130 may also support various heating modes in terms of wattage and temperature according to different output voltage Pout. In one embodiment, the heating carrier 130 may, for example, have a resistance value of 1 ohm, and may support a heating effect of up to 400 watts, for example.

Figure 3:
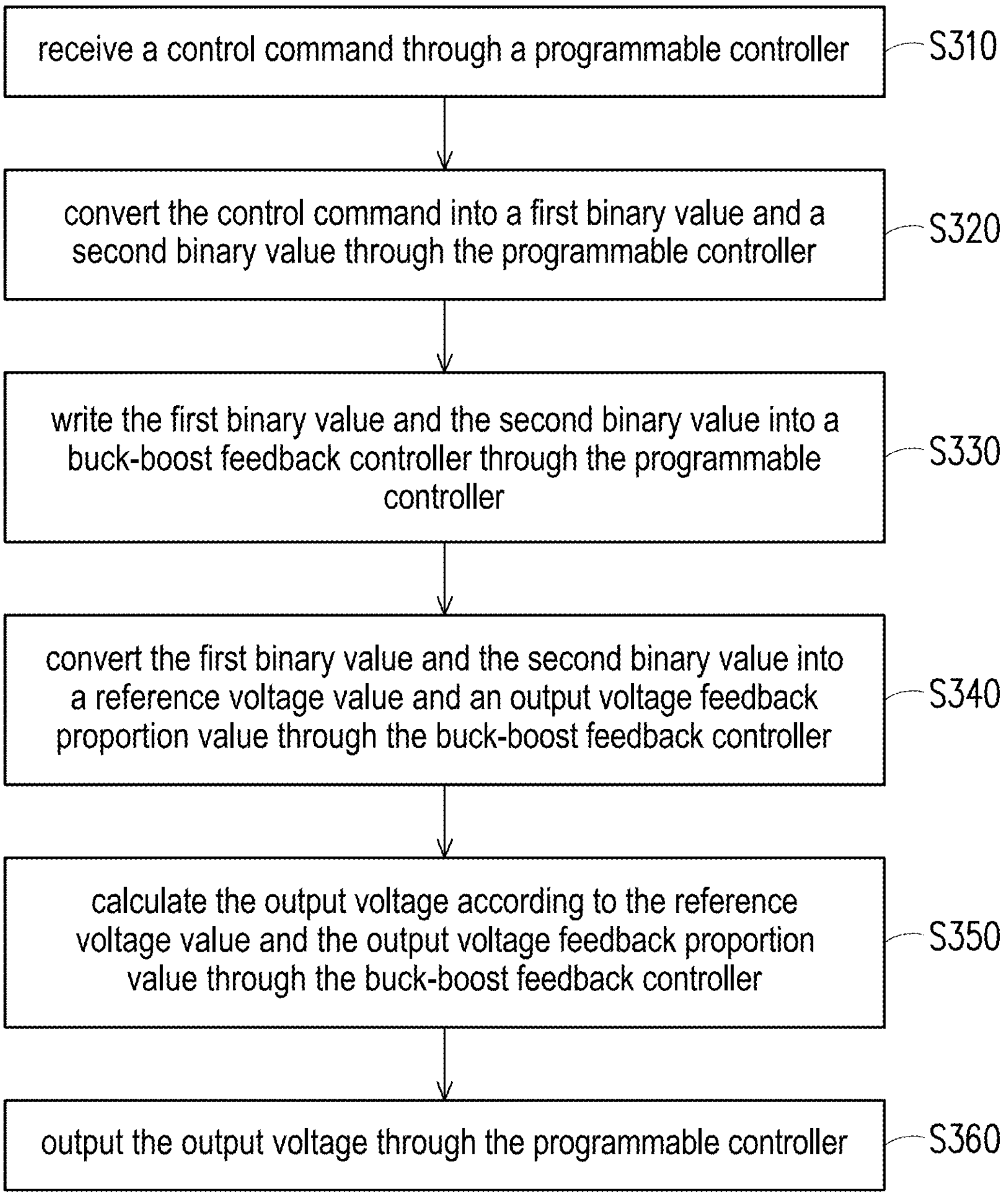
FIG. 3 is a flow chart of a heating control method according to an embodiment of the disclosure.

FIG. 3 is a flow chart of a heating control method according to an embodiment of the disclosure. Referring to FIG. 1 and FIG. 3, in this embodiment, the heating module 100 may perform the following steps S310 to S360. In step S310, the programmable controller 110 may receive a control command. In step S320, the programmable controller 110 may convert the control command into a first binary value and a second binary value. In step S330, the programmable controller 110 may write the first binary value and the second binary value into the buck-boost feedback controller 120. In step S340, the buck-boost feedback controller 120 may convert the first binary value and the second binary value into a reference voltage value and an output voltage feedback proportion value. In step S350, the buck-boost feedback controller 120 may calculate the output voltage according to the reference voltage value and the output voltage feedback proportion value. In step S360, the programmable controller 110 may output the output voltage. In this embodiment, the programmable controller 110 may output the output voltage to the heating carrier 130 to control the heating carrier 130 to perform heating.

Specifically, the user communication interface 210 of the terminal device 200 may send a control command to the programmable controller 110. The control command may correspond to a target wattage value (i.e., heating carrier wattage). The programmable controller 110 may query a first lookup table with data as shown in Table 1 below according to the control command to obtain the first binary value and the second binary value. The first binary value may be a reference voltage register value. The second binary value may be an output voltage feedback proportion register value.

TABLE 1

| reference voltage register value | output voltage feedback proportion register value | target wattage value (W) |
|---|---|---|
| 01 10010111b | 00b | 5.02 |
| 00 10101011b | 10b | 10.05 |
| 10 11011111b | 00b | 15.05 |
| 01 10010111b | 01b | 20.07 |
| 00 11010010b | 11b | 25 |
| 01 01000101b | 10b | 30.03 |
| 01 00000000b | 11b | 35.05 |
| 01 11001100b | 11b | 100 |
| 11 11011000b | 01b | 105.06 |
| 10 10011011b | 11b | 200.22 |
| 11 10010010b | 10b | 205.06 |
| 11 00111010b | 11b | 300.33 |
| 11 01000001b | 11b | 305.2 |
| 11 11000000b | 11b | 400.4 |

Then, the programmable controller 110 may write the first binary value and the second binary value into a first register and a second register of the buck-boost feedback controller 120 through the serial data line pin and the serial clock line pin. The buck-boost feedback controller 120 may, for example, query a second lookup table with date as shown in Table 2 below according to the first binary value and the second binary value to obtain the corresponding reference voltage value and output voltage feedback proportion value.

TABLE 2

| reference voltage register value | output voltage feedback proportion register value | reference voltage value (V) | output voltage feedback proportion value |
|---|---|---|---|
| 01 10010111b | 00b | 0.505 | 0.2256 |
| 00 10101011b | 10b | 0.238 | 0.0752 |
| 10 11011111b | 00b | 0.875 | 0.2256 |
| 01 10010111b | 01b | 0.505 | 0.1128 |
| 00 11010010b | 11b | 0.282 | 0.0564 |
| 01 01000101b | 10b | 0.412 | 0.0752 |

TABLE 2-continued

| reference voltage register value | output voltage feedback proportion register value | reference voltage value (V) | output voltage feedback proportion value |
|---|---|---|---|
| 01 00000000b | 11b | 0.334 | 0.0564 |
| 01 11001100b | 11b | 0.564 | 0.0564 |
| 11 11011000b | 01b | 1.156 | 0.1128 |
| 10 10011011b | 11b | 0.798 | 0.0564 |
| 11 10010010b | 10b | 1.077 | 0.0752 |
| 11 00111010b | 11b | 0.978 | 0.0564 |
| 11 01000001b | 11b | 0.985 | 0.0564 |
| 11 11000000b | 11b | 1129 | 0.0564 |

The buck-boost feedback controller 120 may perform operation of the following formula (1) to obtain the output voltage, where the reference numeral Pout represents the output voltage, the reference numeral Vref represents the reference voltage value, and the reference numeral Rout represents the output voltage feedback proportion value.

$$Pout = \frac{Vref}{Rout} \qquad \text{Formula (1)}$$

For example, if the user wishes to enable the heating carrier 130 to achieve 35 watts of heating, the user may send a control command corresponding to the 35 watts to the programmable controller 110 through the user communication interface 210 of the terminal device 200. The programmable controller 110 may find the corresponding first binary value "01 00000000b" and second binary value "11b" according to the Table 1. The programmable controller 110 may write the first binary value "01 00000000b" and the second binary value "11b" to the first register and the second register of the buck-boost feedback controller 120. The buck-boost feedback controller 120 may find the Table 2 according to the first binary value "01 00000000b" and the second binary value "11b" to obtain a corresponding reference voltage value "334" and output voltage feedback proportion value "0.0564". The buck-boost feedback controller 120 may perform the operation of the formula (1) according to the reference voltage value "0.334(V)" and the output voltage feedback proportion value "0.0564" to obtain the corresponding output voltage "5.92(V)". Finally, the buck-boost feedback controller 120 may provide the output voltage "5.92(V)" to the heating carrier 130.

Figure 4:
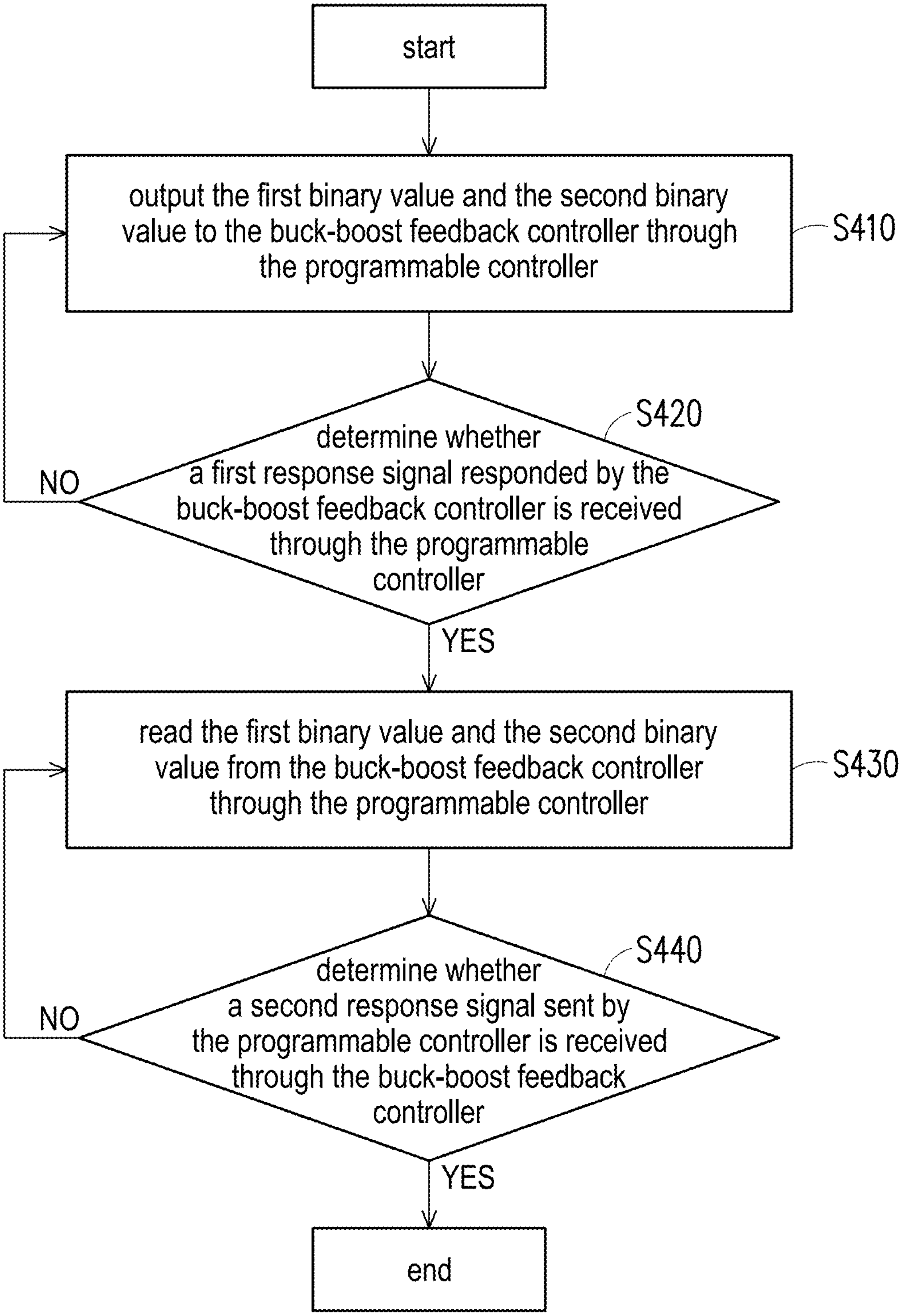
FIG. 4 is a data transmission confirmation flow chart according to an embodiment of the disclosure.
Figure 5A:
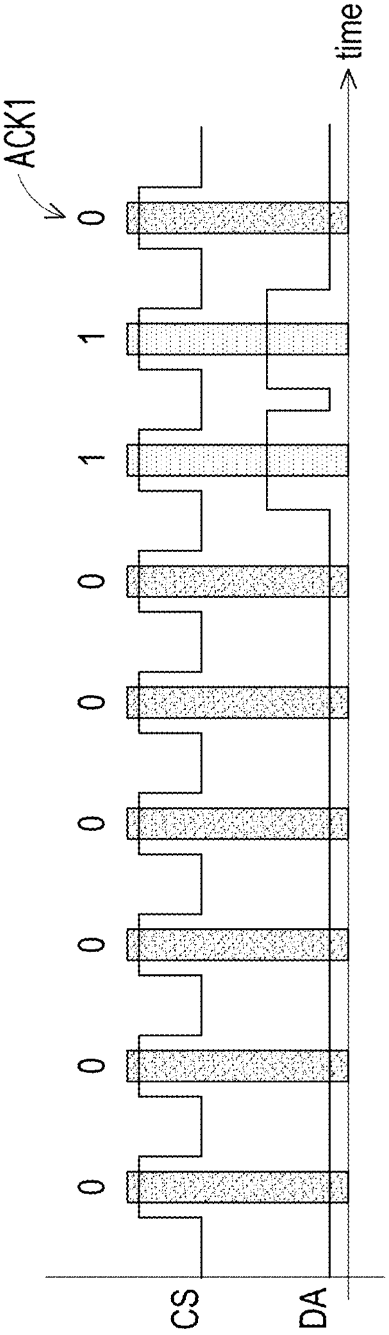
FIG. 5A is a signal diagram of data writing according to an embodiment of the disclosure.
Figure 5B:
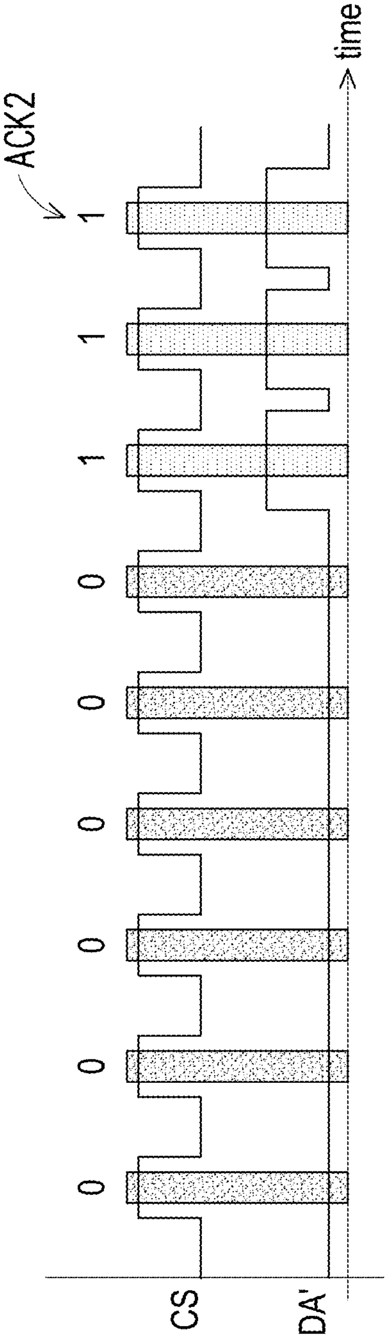
FIG. 5B is a signal diagram of data readout according to an embodiment of the disclosure.

FIG. 4 is a data transmission confirmation flow chart according to an embodiment of the disclosure. FIG. 5A is a signal diagram of data writing according to an embodiment of the disclosure. FIG. 5B is a signal diagram of data readout according to an embodiment of the disclosure. Referring to FIG. 1, FIG. 4 to FIG. 5B, the step of writing data to the buck-boost feedback controller 120 by the programmable controller 110 may further include data confirmation operations such as the following steps S410 to S440. In step S410, the programmable controller 110 may output the first binary value and the second binary value to the buck-boost feedback controller 120. In this regard, after the programmable controller 110 writes the first binary value and the second binary value into the buck-boost feedback controller 120, the buck-boost feedback controller 120 may respond with a first response signal to the programmable controller 110. In step S420, the programmable controller 110 may determine whether the first response signal responded by the buck-boost feedback controller 120 is received. If no, step S410 is performed again or continued. If yes, step S430 is executed.

For example, as shown in FIG. 5A, a serial clock line between the programmable controller 110 and the buck-boost feedback controller 120 may transmit a clock signal CS as shown in FIG. 5A. Moreover, the programmable controller 110 may transmit a data signal DA as shown in FIG. 5A to the buck-boost feedback controller 120 through a serial data line between the programmable controller 110 and the buck-boost feedback controller 120. The data signal DA may, for example, include data corresponding to the binary value "00000011", where the binary value "0" is represented by a low voltage level signal waveform, and the binary value "1" is represented by a high voltage level signal waveform. Moreover, when the buck-boost feedback controller 120 receives the above data, the buck-boost feedback controller 120 may respond with a first response signal ACK1 to the programmable controller 110 through the serial data line, where the first response signal ACK1 may be represented by binary value "0".

In step S430, the programmable controller 110 may read the first binary value and the second binary value from the buck-boost feedback controller. In this regard, after completely receiving the first binary value and the second binary value, the programmable controller 110 may send a second response signal to the buck-boost feedback controller 110. In step S440, the buck-boost feedback controller 120 may determine whether the second response signal sent by the programmable controller 110 is received. If no, step S430 is performed again or continued. If yes, the current data transmission operation is terminated.

For example, as shown in FIG. 5B, the serial clock line between the programmable controller 110 and the buck-boost feedback controller 120 may transmit the clock signal CS as shown in FIG. 5B. Moreover, the programmable controller 110 may read a data signal DA' as shown in FIG. 5B through the serial data line between the programmable controller 110 and the buck-boost feedback controller 120. The data signal DA' may include data corresponding to the binary value "00000011" (i.e., the data written to the buck-boost feedback controller 120 by the programmable controller 110). Moreover, when the programmable controller 110 receives the data, the programmable controller 110 may respond with a second response signal ACK2 to the programmable controller 110 through the serial data line, where the second response signal ACK2 may be represented by binary value "1". Thus, when the programmable controller 110 and the buck-boost feedback controller 120 complete steps S410 to S440, it means that the binary value has been successfully written into the register of the buck-boost feedback controller 120.

In summary, the heating module and the heating control method of the disclosure may be connected to the heating module through the terminal device to achieve convenient heating control functions. In some embodiments of the disclosure, the heating module may also support different input voltage specifications and have the function of providing different output voltage specifications, and may provide heating effects of multiple wattages.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A heating module, comprising:
a buck-boost feedback controller; and
a programmable controller, coupled to the buck-boost feedback controller, configured to receive a control command,
wherein the programmable controller converts the control command into a first binary value and a second binary value, and writes the first binary value and the second binary value into the buck-boost feedback controller,
wherein the buck-boost feedback controller converts the first binary value and the second binary value into a reference voltage value and an output voltage feedback proportion value, and calculates an output voltage according to the reference voltage value and the output voltage feedback proportion value,
wherein the programmable controller outputs the output voltage.

2. The heating module according to claim 1, wherein after the programmable controller writes the first binary value and the second binary value into the buck-boost feedback controller, the buck-boost feedback controller responds with a first response signal to the programmable controller.

3. The heating module according to claim 1, wherein the programmable controller reads the first binary value and the second binary value from the buck-boost feedback controller, and after completely receiving the first binary value and the second binary value, the programmable controller sends a second response signal to the buck-boost feedback controller.

4. The heating module according to claim 1, wherein the control command corresponds to a target wattage value, and the programmable controller queries a first lookup table according to the control command to obtain the first binary value and the second binary value.

5. The heating module according to claim 1, wherein the programmable controller writes the first binary value and the second binary value into a first register and a second register of the buck-boost feedback controller.

6. The heating module according to claim 1, wherein the buck-boost feedback controller queries a second lookup table according to the first binary value and the second binary value to obtain the reference voltage value.

7. The heating module according to claim 6, wherein the buck-boost feedback controller queries the second lookup table according to the first binary value and the second binary value to obtain the output voltage feedback proportion value.

8. The heating module according to claim 1, wherein the programmable controller is further coupled to a terminal device to receive the control command from the terminal device.

9. The heating module according to claim 1, wherein the heating module further comprises a heating carrier coupled to the buck-boost feedback controller.

10. The heating module according to claim 9, wherein the buck-boost feedback controller outputs the output voltage to the heating carrier.

11. The heating module according to claim 9, wherein the heating carrier comprises a heating coil coupled between an output voltage and a ground voltage.

12. A heating control method, comprising:
receiving a control command through a programmable controller;
converting the control command into a first binary value and a second binary value through the programmable controller;
writing the first binary value and the second binary value into a buck-boost feedback controller through the programmable controller;
converting the first binary value and the second binary value into a reference voltage value and an output voltage feedback proportion value through the buck-boost feedback controller;
calculating an output voltage according to the reference voltage value and the output voltage feedback proportion value through the buck-boost feedback controller; and
outputting the output voltage through the programmable controller.

13. The heating control method according to claim 12, wherein writing the first binary value and the second binary value into the buck-boost feedback controller comprises:
responding with a first response signal to the programmable controller through the buck-boost feedback controller.

14. The heating control method according to claim 12, wherein writing the first binary value and the second binary value into the buck-boost feedback controller comprises:
reading the first binary value and the second binary value from the buck-boost feedback controller through the programmable controller; and
after completely receiving the first binary value and the second binary value, sending a second response signal to the buck-boost feedback controller through the programmable controller.

15. The heating control method according to claim 12, wherein the control command corresponds to a target wattage value, and the programmable controller queries a first lookup table according to the control command to obtain the first binary value and the second binary value.

16. The heating control method according to claim 12, wherein the programmable controller writes the first binary value and the second binary value into a first register and a second register of the buck-boost feedback controller.

17. The heating control method according to claim 12, wherein the buck-boost feedback controller queries a second lookup table according to the first binary value and the second binary value to obtain the reference voltage value.

18. The heating control method according to claim 17, wherein the buck-boost feedback controller queries the second lookup table according to the first binary value and the second binary value to obtain the output voltage feedback proportion value.

19. The heating control method according to claim 12, wherein the programmable controller receives the control command from a terminal device.

20. The heating control method according to claim 12, wherein outputting the output voltage through the programmable controller comprises:
outputting the output voltage to a heating carrier through the programmable controller.

* * * * *